United States Patent
Buckris et al.

(10) Patent No.: US 12,526,139 B2
(45) Date of Patent: Jan. 13, 2026

(54) BLOCKCHAIN-BASED ARTIFICIAL INTELLIGENCE SYSTEM

(71) Applicants: Ruben Buckris, Brooklyn, NY (US); Linda Buckris, Brooklyn, NY (US)

(72) Inventors: Ruben Buckris, Brooklyn, NY (US); Linda Buckris, Brooklyn, NY (US)

(*) Notice: Subject to any disclaimer, the term of this patent is extended or adjusted under 35 U.S.C. 154(b) by 89 days.

(21) Appl. No.: 18/425,896

(22) Filed: Jan. 29, 2024

(65) Prior Publication Data

US 2025/0247227 A1    Jul. 31, 2025

(51) Int. Cl.
*H04L 9/14*        (2006.01)
*G06F 21/57*       (2013.01)
*H04L 9/00*        (2022.01)

(52) U.S. Cl.
CPC .............. *H04L 9/14* (2013.01); *G06F 21/577* (2013.01); *H04L 9/008* (2013.01); *H04L 9/50* (2022.05)

(58) Field of Classification Search
CPC ... H04L 9/008; H04L 9/14; H04L 9/50; G06F 21/577
USPC ......................................................... 713/171
See application file for complete search history.

(56) References Cited

U.S. PATENT DOCUMENTS

| | | | |
|---|---|---|---|
| 2018/0294967 A1* | 10/2018 | Roberts | H04L 9/3255 |
| 2019/0012595 A1* | 1/2019 | Beser | G06N 3/08 |
| 2023/0214370 A1* | 7/2023 | Michaelis | H04L 63/12 |
| 2024/0112271 A1* | 4/2024 | Romney | G06Q 40/06 |
| 2024/0219907 A1* | 7/2024 | Abeloe | B60R 11/0217 |
| 2025/0053972 A1* | 2/2025 | Anton | G06Q 20/223 |

\* cited by examiner

*Primary Examiner* — David P Zarka

(57) ABSTRACT

A blockchain-based artificial intelligence system, with the training of neural network nodes being obtained via oracle-assisted local devices. Nodes are trained using local data, which are then transmitted to the blockchain node application via a smart contract-based electronic transfer platform. Security of the system is ensured using an actively updated anomaly database to detect anomalous code segment updates and anomalous blockchain activity. AI global models are versioned to enable reversion if an operating model is determined to be anomalous.

20 Claims, 4 Drawing Sheets

BLOCKCHAIN-BASED ARTIFICIAL INTELLIGENCE SYSTEM

SUMMARY

Figure 1:
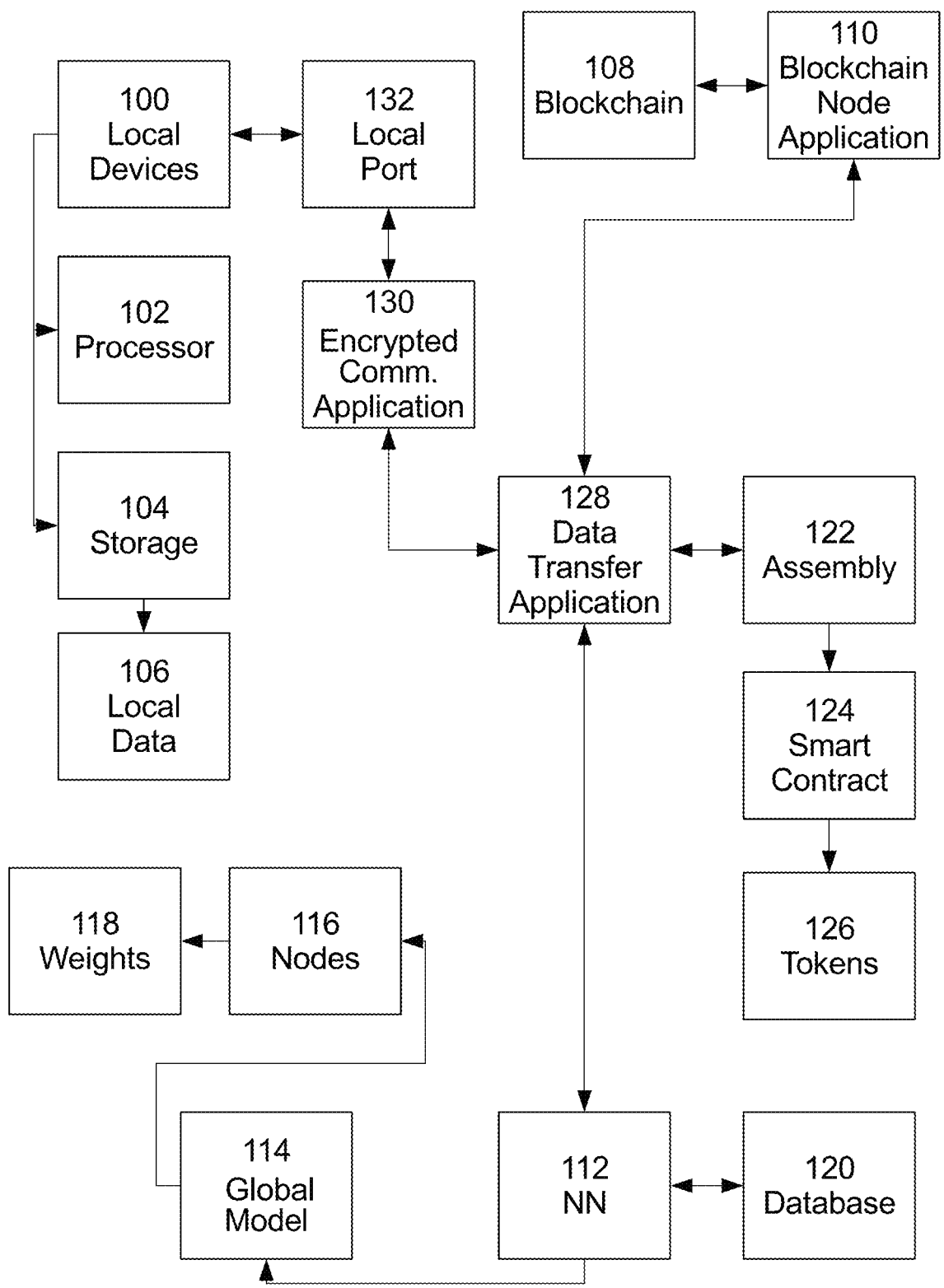

By integrating blockchain and neural networks, it is possible to combine the decentralization, transparency, and security of blockchain with the learning capabilities of neural networks. A description of the integration of these two technologies is below.

In one embodiment, the blockchain is used to create a decentralized network for federated learning. Federated learning is a decentralized machine learning approach that allows a model to be collaboratively trained across multiple decentralized edge devices (such as smartphones, IoT devices, or other local nodes) holding local data samples, and the learnings are aggregated to improve the overall model without exposing individual data points. Participants, i.e., nodes, in the network each have access to local data which is contributed to the learning.

Federated learning may involve the initialization of a global model on a central server. This global model may be distributed to a plurality of local devices (i.e., nodes) which in turn participate in the federated learning process by training the localized model using the local device data. In order to maintain privacy, the local device data (raw data) is not sent to the central server; instead, after local training, only the updates to the local models (i.e., gradients or weights) are transmitted to the central server—these updates are used to update the global model. The steps of model distribution, local training, model updates, and global incorporation of those updates may be repeated iteratively. The updates are then stored on the blockchain, where consensus mechanisms may be utilized to ensure integrity of the learning process and the model generally.

In one embodiment, for training with real-world data, oracles can be used to feed such data into smart contracts and neural networks. This enables the training of the AI system with up-to-date information. The oracles may provide the initial global model parameters, assist in aggregation of model updates, optimize hyperparameters of the federated learning algorithm, etc. Oracles may be smart contracts themselves, guidance mechanisms providing external data to the smart contracts to assist in decision making, artificial intelligent systems, or other entities or systems.

The exchange of data may be facilitated by a decentralized data marketplace, which may be a platform or system utilizing a blockchain infrastructure. Distributed ledger technology may be used to ensure data exchanges that are both transparent and secure. Further, the exchange may be executed using smart contracts to enforce transaction terms and automate transactions. The data exchanged via the decentralized data marketplace may be used in the federated learning described above. Token-based systems may be implemented to incentivize data sharing.

The learning process may be facilitated by smart contracts deployed on the blockchain. The smart contracts may distribute the initial global model parameters to the local devices, arrange for the encrypted transfer of the trained global model nodes, and enable the updating and validating of the global models. In order to incentivize the training of the global model nodes, the smart contracts may reward local devices for their processing and data contributions with cryptographic tokens.

Homomorphic encryption is a cryptographic technique that enables computations to be performed on encrypted data without decrypting it first. In one embodiment, homomorphic encryption can be combined with federated learning to allow training on encrypted local data. This ensures that sensitive data remains confidential even when computations are performed across the decentralized networks. Homomorphic encryption may include partially homomorphic encryption, where a single operation (such as addition or multiplication) is performed on the encrypted data, or fully homomorphic encryption, in which two operations (such as addition and multiplication) are performed.

Homomorphic encryption involves a public key and a secret key, with the public key being used for encrypting the data and the secret key is used to decrypt the data. The local devices may use local public keys or grandmaster public keys distributed by the smart contracts or explicit in the global model itself. The secret keys may be generated locally and then sent securely via smart contract functions to the central server, or they may be generated implicitly, securely, and in an encrypted manner within the global model.

In one embodiment, once a neural network is trained, its model parameters, or even the entire model, may be stored on the blockchain, thereby bestowing on it a degree if immutability and transparency. In one variation, users can verify the integrity of the model by checking the data stored on the blockchain.

In one embodiment, the neural networks are stored on decentralized storage systems such as the InterPlanetary File System (IPFS). Thus, neural network nodes are distributed in a decentralized manner across a plurality of network nodes (e.g., local devices). Hashes or references to the data can be stored on the blockchain, ensuring efficient storage and retrieval of blockchain and AI-related data. Versioning and deduplification mechanisms can be used to ensure that previous versions of the blockchain and AI-related data remain available while preserving the cohesion of the global/local models.

The blockchain may be used to train, store, and operate an AI system, but AI can also be used to preserve the blockchain, and therefore the trained, stored, and operated AI system.

The components of an effective and efficient AI System, such as training data, model parameters, and updates, may be stored on the blockchain, and thus the blockchain may operate as a platform for training the AI system. A blockchain based AI system may accordingly be decentralized, immutable, transparent, and tamper resistance. Additionally, the blockchain may be used to execute the operation of the AI System via smart contracts and other decentralized applications.

The AI system trained, stored, and operated by the blockchain can be the same AI system, a portion of the same AI system, or a separate AI system than the AI system that is designed at least in part to preserve and facilitate the operation of the blockchain, with the former being a so-called "decentralized AI system" and the latter being a so-called "blockchain governing AI system". Thus, there may be a bilateral symbiotic relationship between the blockchain and the AI system(s). The blockchain benefits from AI by gaining advanced analytical capabilities, improved security measures, and optimized consensus mechanisms. The AI system(s) benefit from the blockchain by having a decentralized and transparent platform for training, storage, and operation, as well as by leveraging the blockchain's security features.

The blockchain governing AI system may contribute to the preservation of the blockchain by analyzing and securing data. It may employ anomaly detection, encryption, or other security measures to ensure the integrity of the data stored on the blockchain. AI algorithms may be applied to optimize and enhance the consensus mechanisms used by the blockchain by using machine learning to improve the efficiency and security of consensus protocols. AI-based monitoring systems can actively watch for unusual patterns, potential attacks, or performance issues within the blockchain network. Early detection of anomalies can contribute to the overall health and security of the blockchain.

The decentralized AI system trained, stored, and operated by the blockchain can be the same system as the blockchain governing AI system. In this case, the blockchain not only serves as a training ground but also provides a secure and transparent environment for the continuous operation of the AI.

Different components of the AI system might be distributed. For instance, some components may reside on the blockchain for execution, while others operate off-chain. This hybrid approach allows for flexibility and scalability with an overlap between the blockchain governing AI system and the decentralized AI system, such that the blockchain governing AI system is party decentralized.

Another AI system may be specifically designed to preserve and enhance the blockchain. This AI could focus on security, optimization, or efficiency measures to maintain the robustness of the blockchain infrastructure.

In one embodiment, Decentralized Autonomous Organizations (DAOs) can be formed to govern AI initiatives. Token holders in the DAO can collectively make decisions about model updates by evaluating the impact of model impacts on performance, accuracy, and other relevant metrics; voting mechanisms such as whether a given decision—or all decisions—should be made by a simple majority vote or some more sophisticated voting system; data usage policies, including permissions for data access to ensure privacy compliance, or whether to integrate new data sources into the AI system based on the diversity and representativeness of the training data; the incentive reward structures for encouraging data contributors, developers, and other participants to contribute to the AI system's improvement; staking mechanisms enabling token holders to stake tokens to signal confidence in regard to specific model updates; governing policies including DAO governance rules and smart contract updates; as well as overall AI strategy.

In one embodiment, the AI system is run independently on nodes throughout a network. The AI system may comprise a governance system that manages ledger-holder voting mechanisms, encryption and decryption actions, codebase amendment allowances, disclosure gatekeeping, and other tasks relating to the maintenance, security, efficiency, and efficacy of the blockchain.

Detecting changes to a blockchain codebase is crucial for maintaining the integrity and security of the system. In one embodiment, the AI System may detect unauthorized changes to the blockchain code. Below are methods to design a blockchain-based AI system that can effectively detect and analyze changes to its codebase:

In one embodiment, the AI system implements a version control system for the blockchain database. Changes are tracked, and updates or modifications are documented. The AI System may implement tamper-evident logging mechanisms to automatically record all changes to the codebase as well as any other relevant details pertaining to the changes. The change logs may be analyzed for vulnerabilities or potential exploitation. In one version, the AI system uses static analysis and dynamic analysis tools to identify potential vulnerabilities in changes to the code. Using static code analysis, the AI system may detect insecure dependencies and potential attack vectors. AI Algorithms may learn from historical data and known vulnerabilities to identify patterns indicative of malicious code. Known vulnerabilities may be searched on dedicated databases, forums, etc. Using dynamic code analysis, the AI system may examine the behavior of the blockchain code during runtime. This involves executing the code in a controlled environment and monitoring it for unexpected actions.

In one embodiment, the AI system executes periodic automated testing and verification of the codebase integrity and authenticity using both static and dynamic analysis techniques. The AI system may monitor the testing for irregularities or unexpected changes. In one embodiment, random transactions are audited for anomalous behavior. One technique the AI system may use to determine such anomalous behavior is by determining if the audited transaction would be executed differently if it occurred on a prior version of the codebase, and then determining if any of the parties connected to the transaction, or parties connected to those parties, were involved in the changes, either through recommendation of changes or voting for said changes.

The AI System may analyze the code for vulnerabilities and calculate a risk level for any vulnerabilities detected. The calculated risk level may be incorporated into recommendations for reducing the risk level, which in turn may be incorporated into communications transmitted to ledger-holders. The recommendations may include selections of code to be swapped with functionally equivalent safe code, or code which is known to support the rest of the system without introducing dangerous functionalities.

The AI System, upon detecting a vulnerability, either in the codebase or in proposed or pending changes, may determine how to fix the vulnerability by replacing the code using databases of known solutions or using historical data. If a known solution exists in the vulnerability database, the AI system may automatically generate a patch or suggest a fix. This could involve replacing or updating the affected code with a more secure version. Depending on the nature of the vulnerability, the AI system may recommend replacing the vulnerable code with a safer alternative or modifying the code to eliminate the security flaw. The replacement code could be sourced from a library of secure code snippets. The AI system analyzes historical data to understand how similar vulnerabilities were addressed in the past. This helps in making informed decisions about the most effective and secure fixes.

In one embodiment, the AI System generates a cryptographic hash of the codebase and stores it on the blockchain. The AI System may generate iterative cryptographic hashes of the codebase whenever an approved change to the codebase is effected. These iterative cryptographic hashes may comprise only the changes and data pertaining to those changes, or alternatively the entirety of the changed code. In one variation, the ledger holders who approved and/or disapproved of the change is additionally hashed into the codebase. In yet another variation, each party responsible for effecting the change is hashed into the codebase.

In one embodiment, the AI System stores the decryption key for the cryptographic hashes of the codebase, changes to the codebase, and the ledgerholders/parties associated with changes or votes to change the codebase. The AI System may store the decryption key within or separately from the blockchain. The AI System may store the codebase as well as any changes in decentralized repositories having a riding relationship with the main blockchain, such that it shares ledger-holders in common but constitutes a separate blockchain.

The AI system continuously monitors the codebase and determines if changes are being made, or it may periodically verify the cryptographic hash against the current state of the codebase. Mismatches indicate tampering with the code.

In one embodiment, the AI System may alert ledger holders of attempts to change or otherwise tamper with the codebase. This alert may take the form of notifications through a secure communication channel or a dedicated dashboard.

In one embodiment, the AI system comprises a communication module, which may be a set of algorithms, databases, and user interfaces, for communicating with ledgerholders or other interested parties. The AI system may inquire, using natural language processing, as to whether the users gave their consent to, approval for, or rejected the changes. The AI system may receive responses from the ledgerholders via the same communication module.

In one embodiment, upon detecting changes or requests for changes to the blockchain, the AI system will halt all transactions or recordations from or pertaining to a ledgerholder until the ledgerholder approves or rejects such changes.

In one variation, ledger holders are given a cryptocurrency reward for responding to AI system communications regarding proposed or detected changes. In another variation. In another variation, ledger holders are conversely penalized for not responding.

In one variation, the blockchain's core functionality is immutable once deployed.

In another variation, codebase changes require multi-signature authorization from ledger holders.

In another variation, code changes require an encrypted voting mechanism embedded in the blockchain that enables ledger holders to vote for any proposed amendments to the code base.

In one embodiment, the AI system comprises a mechanism for emergency code rollback upon detecting an unauthorized change. In one variation, the rollback is effected immediately upon detecting the unauthorized change. In another variation, the rollback is effected after receiving multi-signature or consensus approval from ledger holders. In yet another variation, the rollback is effected after a set period of time unless the rollback is disapproved by ledger holders within that set period.

The blockchain consensus mechanism may be proof of stake (POS) or delegated proof of stake (DPoS).

BRIEF DESCRIPTION

Figure 2:
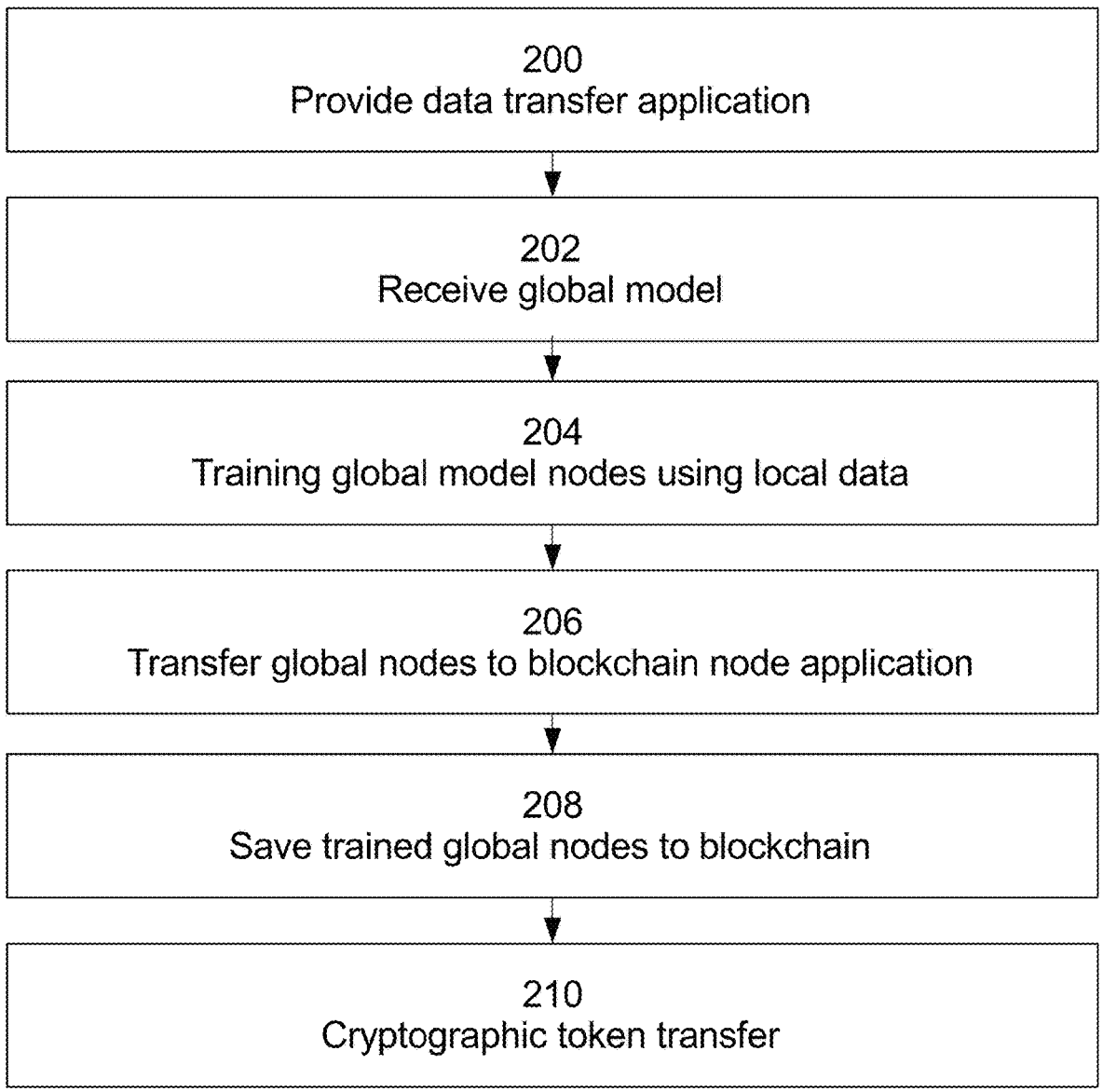
Figure 3:
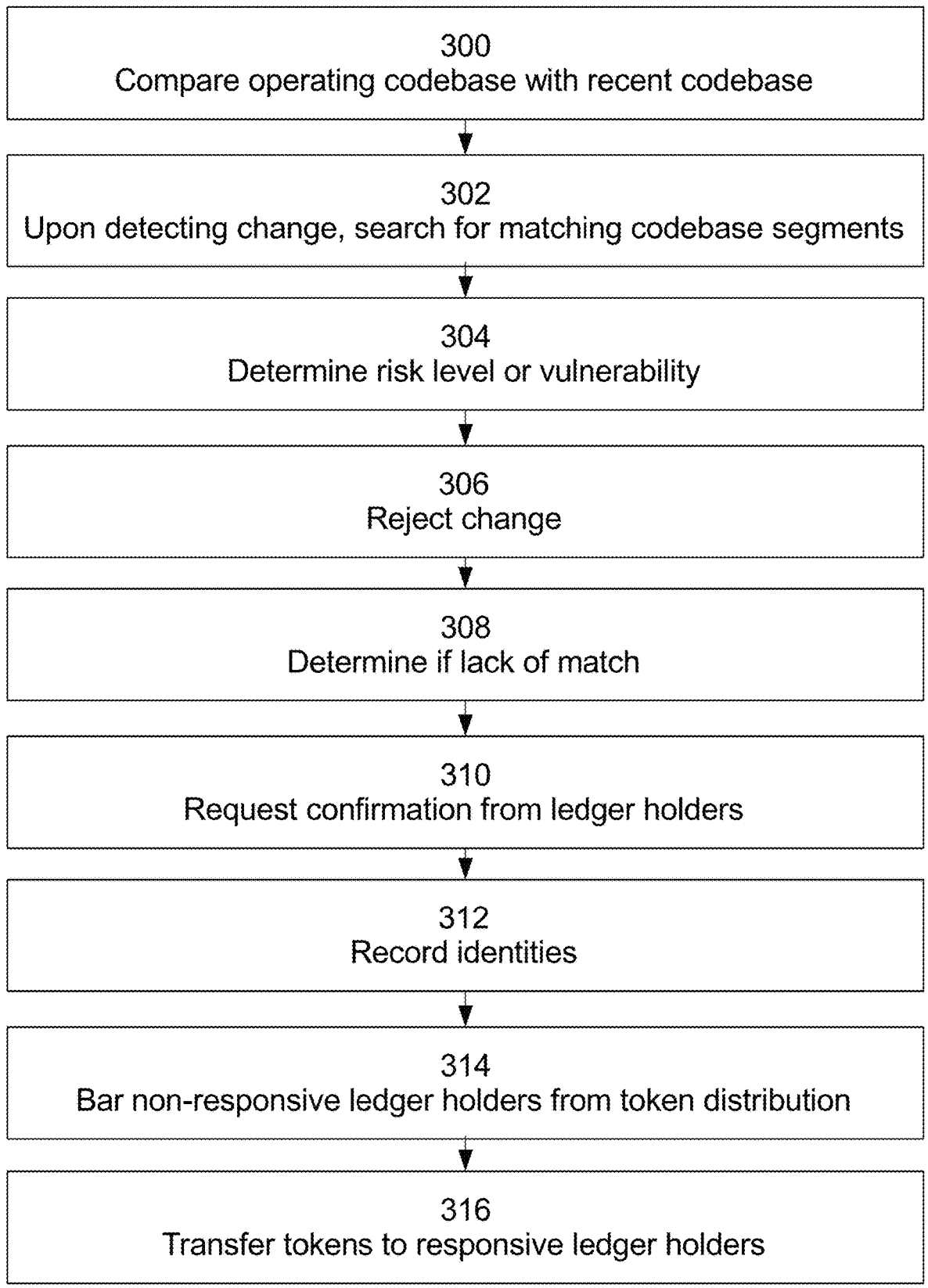
Figure 4:
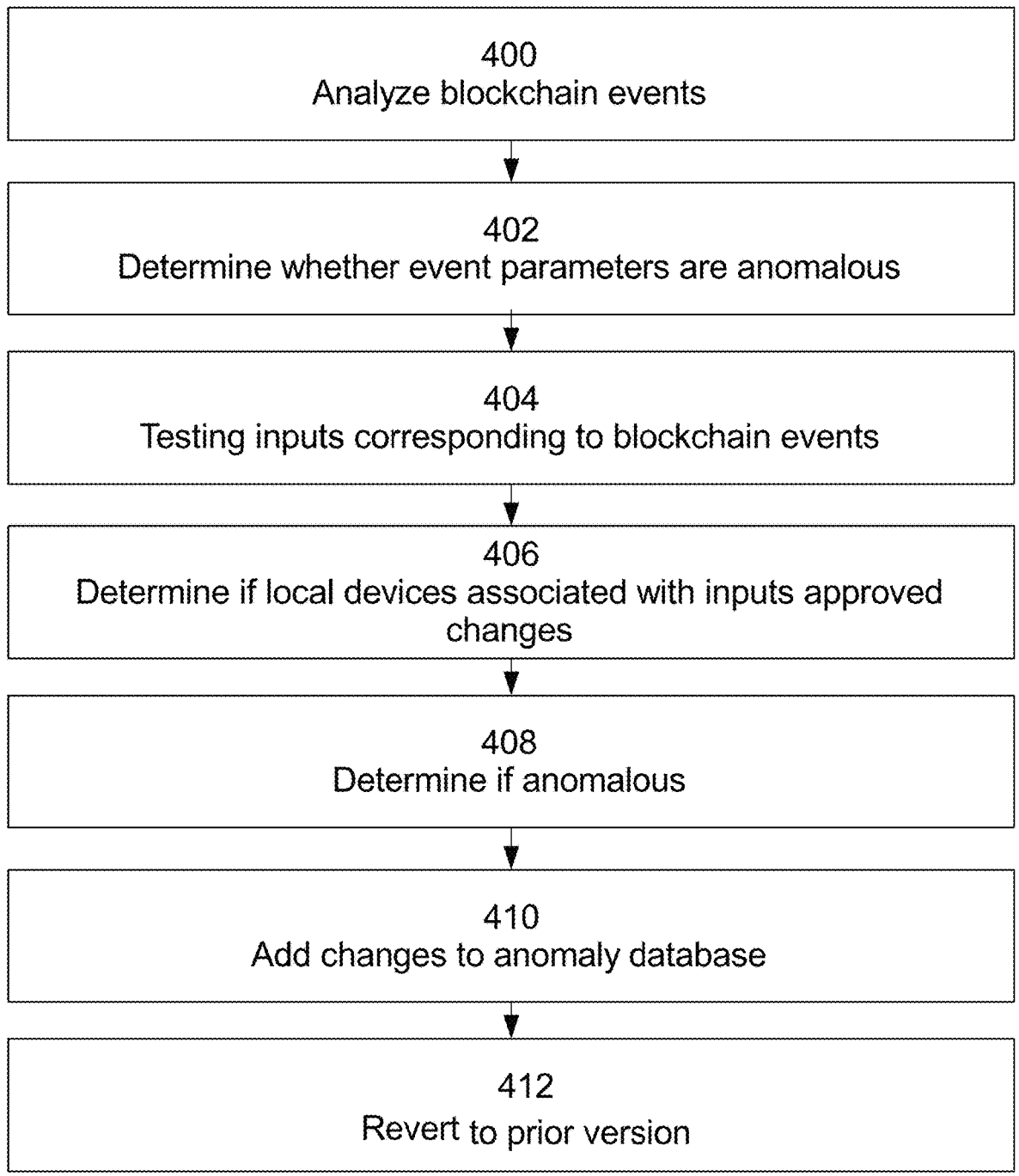

FIG. 1 shows an exemplary system architecture.
FIG. 2 shows an exemplary system process.
FIG. 3 shows an exemplary system process.
FIG. 4 shows an exemplary system process.

DETAILED DESCRIPTION

Monitoring and governance of the Blockchain-based AI System may be achieved through the implementation of smart contracts, particularly a smart contract assembly configured to execute a plurality of mutually engaging smart contracts. Each smart contract may have a designate task or set of tasks, such as storing the blockchain codebase, proposing changes, or managing the confirmation or voting process pertaining to those changes.

The system may feature a platform or ecosystem comprising a plurality of local devices controlled by disparate users. Each of these users may, through their local devices, serve as ledger holders for the blockchain, and accordingly, may partake in the confirmation or voting process.

The system may comprise an AI monitoring module. The module may comprise a set of AI algorithms stored on and/or run off-chain and/or on-chain to monitor the blockchain's codebase for changes. This module may periodically compute the hash of the current codebase and compare it with the stored hash. If a change is detected, the AI monitoring module may trigger the proposal of a new coderbase hash through the Codebase Monitor Contract. The Codebase Monitor Contract receives the proposed codebase hash from the AI module and emits an event to notify the ledger holders about the proposed change. Ledger holders receive notifications of the proposed change and can participate in the confirmation/voting process.

A voting module, optionally coupled to the encrypted communication module and managed by the smart contract assembly (via a governance contract), may enable ledger holders to vote on proposed codebase changes. The smart contract assembly may set a confirmation threshold, such as a supermajority vote, for acceptance of codebase change proposals.

The AI System may comprise expert systems or neural networks. The neural networks may be trained using the blockchain itself, where ledger holders provide the processing power for training and running the neural networks. The trained neural network may be saved as blocks of data on the blockchain.

As shown in FIG. 1, the AI blockchain system may feature a plurality of local devices 100, with each local device in the plurality of local devices comprising a processor 102 and a storage medium 104 for storing local data 106; a blockchain 108 and a blockchain node application 110; a neural network 112, with the neural network comprising a global model 114, with the global model comprising global nodes 116, with the global nodes having node weights 118, with the neural network configured to be instructionally and informationally engaged with the blockchain node application; an anomaly database 120; a smart contract assembly 122, with the smart contract assembly comprising one or more smart contracts 124, and configured to be instructionally and informationally engaged with the neural network and the blockchain node application; cryptographic tokens 126 operating via the blockchain, with the cryptographic tokens being managed by the smart contract assembly; with the smart contract assembly comprising or controlling a decentralized data transfer application 128 and an encrypted communication application 130; with the decentralized data transfer application operating on the blockchain, comprising a localized port 132, and providing an exchange interface between the plurality of local devices and the blockchain node application to facilitate the transfer of data.

The decentralized data transfer application may be configured to distribute the operating version of the global model across the plurality of local devices; The localized port may be saved to and configured to operate on the plurality of local devices or configured to be accessed by the plurality of local devices. Each local device may operate as a ledger holder of the blockchain and may be configured to via the localized port train the global nodes by adjusting node weights using the local data. The localized port may be configured to transfer the trained global nodes to the blockchain node application via the decentralized data exchange platform. The blockchain node application may be configured to save the trained global nodes to the blockchain. The smart contract assembly may be configured to transmit cryptographic tokens to the local devices in exchange for transmission of the trained global nodes. The blockchain node application may be configured to update the global model using the trained global nodes to produce the operating global model. The neural network may be trained to periodically or continuously compare the operating global model, database, or assembly with the recent global model, database, or assembly to detect instances of change. The global model may be a version of the global model amongst a set of versions of the global model, with each version of the global model being saved to the blockchain via the blockchain node application. The set of versions of the global model comprising an operating version of the global model and a recent version of the global model, with the recent version of the global model having been deployed prior to the operating version of the global model.

The anomaly database may be a version of the database amongst a set of versions of the database, with each version of the database being saved to the blockchain via the blockchain node application. The set of versions of the database may comprise an operating version of the database and a recent version of the database, with the recent version of the database having been deployed prior to the operating version of the database. The smart contract assembly may be a version of the assembly amongst a set of versions of the assembly, with each version of the assembly being saved to the blockchain via the blockchain node application. The set of versions of the assembly may comprise an operating version of the assembly and a recent version of the assembly, with the recent version of the assembly having been deployed prior to the operating version of the assembly.

As shown in FIG. 2, the smart contract assembly may provide a decentralized data transfer application 200; local devices may receive a global model via the same 202; localized ports of the decentralized data transfer application may assist the local devices in training global nodes using local data 204; the localized port may then transfer the trained global nodes to the blockchain node application 206; the blockchain node application may then save the trained global nodes to the blockchain 208. The smart contract assembly may reward the local devices for training the global nodes with cryptographic tokens 2010.

As shown in FIG. 3, the neural network may periodically, continuously, or systematically compare the operating global model, anomaly database, smart contracts assembly, or any other system or application running on the blockchain, with a prior version—or else a changed version with the operating version 300; upon detecting a change, the neural network may search the anomaly database for matching code segments 302; if such matching segments are found and designated as having a risk level or enabling a system vulnerability 304, the neural network may reject such a change 306; if the instances of change do not match segments in the database 308, the neural network may request confirmation of the change from ledger holders 310; identities of local devices approving the changes may be recorded 312, local devices that have not responded to the confirmation request may be barred from cryptographic token distribution 314, and/or local devices that have responded may be rewarded 316.

As shown in FIG. 4, the neural network may be trained to analyze blockchain events transpiring for a given period after attempted instances of change are incorporated into a codebase 400, and then determine whether blockchain event parameters are anomalous by matching the blockchain event parameters to flagged parameters in the anomaly database 402, and testing inputs corresponding to blockchain events in each of the incorporated versions of the codebase as well as the prior versions to determine if there are substantial differences in the parameters 404—and if so, determine if local devices associated with the inputs approved the instances of change 406. If the events are determined to be anomalous 408, the changes are added to the anomaly database 410 and the prior version is reverted to 412.

The invention claimed is:

1. An artificial intelligence system comprising:
   a. a plurality of local devices, with each local device in the plurality of local devices comprising a processor and a storage medium for storing local data;
   b. a blockchain and a blockchain node application;
   c. a neural network;
      i. with the neural network comprising a global model, with the global model comprising global nodes, with the global nodes having node weights;
      ii. with the neural network configured to be instructionally and informationally engaged with the blockchain node application;
      iii. with the global model being a version of the global model amongst a set of of the global model, with each version of the global model being saved to the blockchain via the blockchain node application;
      iv. with the set of the global model comprising an operating version of the global model and a recent version of the global model, with the recent version of the global model having been deployed prior to the operating version of the global model;
   d. an anomaly database,
      i. with the anomaly database configured to map data sets of code segments, blockchain event parameters, and the node weights to risk levels and known vulnerabilities;
      ii. with the anomaly database being a version of the database amongst a set of of the database, with each version of the database being saved to the blockchain via the blockchain node application;
      iii. with the set of of the database comprising an operating version of the database and a recent version of the database, with the recent version of the database having been deployed prior to the operating version of the database;
   e. a smart contract assembly,
      i. with the smart contract assembly comprising one or more smart contracts, and configured to be instructionally and informationally engaged with the neural network and the blockchain node application;
      ii. with the smart contract assembly being a version of the assembly amongst a set of the assembly, with each version of the assembly being saved to the blockchain via the blockchain node application;
      iii. with the set of the assembly comprising an operating version of the assembly and a recent version of the assembly, with the recent version of the assembly having been deployed prior to the operating version of the assembly;
   f. cryptographic tokens operating via the blockchain, with the cryptographic tokens being managed by the smart contract assembly;
   g. with the smart contract assembly comprising or controlling a decentralized data transfer application and an encrypted communication application;
   h. with the decentralized data transfer application operating on the blockchain, comprising a localized port, and providing an exchange interface between the plurality of local devices and the blockchain node application to facilitate the data transfer;
  i. with the decentralized data transfer application configured to distribute the operating version of the global model across the plurality of local devices;
  ii. with the localized port being saved to and configured to operate on the plurality of local devices or configured to be accessed by the plurality of local devices;
i. with each local device in the plurality of local devices being a ledger holder of the blockchain and configured to via the localized port train the global nodes by adjusting the node weights using the local data;
j. with the localized port configured to transfer the trained global nodes to the blockchain node application via the decentralized data exchange platform, with the blockchain node application configured to save the trained global nodes to the blockchain;
k. with the smart contract assembly configured to transmit cryptographic tokens to the plurality of local devices in exchange for transmission of the trained global nodes;
l. With the blockchain node application configured to update the operating version of the global model using the trained global nodes global model;
m. with the neural network trained to periodically or continuously compare the operating version of the global model, database, or assembly with the recent version of the global model, database, or assembly to detect instances of change;
n. with the neural network trained to detect attempted instances of changes to the operating version of the global model, database, or assembly, and configured to, upon detecting the attempted instances of changes:
  i. match the attempted instances of changes to code segments in the anomaly database;
  ii. if the attempted instances of changes match code segments identified as having a risk level or known vulnerability, reject the attempted instances of changes;
  iii. if the attempted instances of changes do not match code segments identified as having a risk level or known vulnerability, request confirmation from the plurality of local devices of the attempted instances of change via the encrypted communication application;
    1. Record identifications of a first subset of the plurality of local devices approving the attempted instances of changes;
    2. Deny cryptographic token distribution to a second subset of the plurality of local devices that have not either approved nor rejected the attempted instances of changes;
    3. Reward a third subset of the plurality of local devices that have either approved or rejected the attempted instances of changes with cryptographic token distributions;
  iv. upon receiving a consensus confirmation via the encrypted communication application, incorporate the attempted instances of changes into the operating version of the global model, database, or assembly;
  v. if consensus confirmation is not received or if a consensus rejection has been received, add the attempted instances of changes to the anomaly database;
  vi. analyze blockchain events transpiring for a period after the attempted instances of changes are incorporated, determine whether the blockchain event parameters are anomalous;
    1. Determine whether the blockchain event parameters are anomalous by matching the blockchain event parameters in the anomaly database;
    2. Determine whether the blockchain event parameters are anomalous by testing inputs corresponding to the blockchain events with the recent version of the global model, database, or assembly to produce hypothetical blockchain event parameters, and compare the blockchain event parameters with the hypothetical blockchain event parameters to produce a parameter differential; if a parameter differential is greater than a set threshold, determine if a fourth subset of the plurality of local devices associated with the inputs initiated or approved the attempted instances of changes;
  vii. if the blockchain events are determined to be anomalous, archive the operating version of the global model, database, or assembly, revert to the recent version of the global model, database, or assembly, and add the attempted instances of change to the anomaly database.

2. An artificial intelligence system comprising:
a. a plurality of local devices, with each local device in the plurality of local devices comprising a processor and a storage medium for storing local data;
b. a blockchain and a blockchain node application;
c. a set of neural networks;
  i. with the set of neural networks comprising a global model, with the global model comprising global nodes, with the global nodes having node weights;
  ii. with the set of neural networks configured to be instructionally and informationally engaged with the blockchain node application;
  iii. with the global model being a version of the global model amongst a set of of the global model, with each version of the global model being saved to the blockchain via the blockchain node application;
  iv. with the set of the global model comprising an operating of the global model and a recent version of the global model, with the recent version of the global model having been deployed prior to the operating of the global model;
d. an anomaly database,
  i. with the anomaly database configured to map data sets of code segments, blockchain event parameters, and the node weights to risk levels and known vulnerabilities;
e. a decentralized data transfer application and an encrypted communication application;
f. with the decentralized data transfer application operating on the blockchain, comprising a localized port, and providing an exchange interface between the plurality of local devices and the blockchain node application to facilitate the data transfer;
  i. with the decentralized data transfer application configured to distribute the operating of the global model across the plurality of local devices;
  ii. with the localized port being saved to and configured to operate on the plurality of local devices or configured to be accessed by the plurality of local devices;
g. with each local device of the plurality of local devices being a ledger holder of the blockchain and configured to via the localized port train the global nodes by adjusting the node weights using the local data;

h. with the localized port configured to transfer the trained global nodes to the blockchain node application via the decentralized data exchange platform, with the blockchain node application configured to save the trained global nodes to the blockchain;
i. with the blockchain node application configured to update the global model using the trained global nodes to produce the operating version of the global model;
j. with the set of neural networks trained to periodically or continuously compare the operating version of the global model with the recent version of the global model to detect instances of change;
k. with the set of neural networks trained to detect attempted instances of changes to the operating version of the global model and configured to, upon detecting the attempted instances of changes:
  i. match the attempted instances of changes to code segments in the anomaly database;
  ii. if the attempted instances of changes match code segments identified as having a risk level or known vulnerability, reject the attempted instances of changes;
  iii. if the attempted instances of changes do not match code segments identified as having a risk level or known vulnerability, request confirmation from the local devices of the attempted instances of change via the encrypted communication application;
    1. Record identifications of a first subset of the plurality of local devices approving the attempted instances of changes;
    2. Deny cryptographic token distribution to a second subset of the plurality of local devices that have not either approved nor rejected the attempted instances of changes;
    3. Reward a third subset of the plurality of local devices that have either approved or rejected the attempted instances of changes with cryptographic token distributions;
  iv. upon receiving a consensus confirmation via the encrypted communication application, incorporate the attempted instances of changes into the operating version of the global model;
  v. analyze blockchain events transpiring for a period after the attempted instances of changes are incorporated, determine whether the blockchain event parameters are anomalous;
    1. Determine whether the blockchain event parameters are anomalous by matching the blockchain event parameters in the anomaly database;
    2. Determine whether the blockchain event parameters are anomalous by testing inputs corresponding to the blockchain events with the recent version of the global model or assembly to produce hypothetical blockchain event parameters, and compare the blockchain event parameters with the hypothetical blockchain event parameters to produce a parameter differential; if a parameter differential is greater than a set threshold, determine if a fourth subset of the plurality of local devices associated with the inputs initiated or approved the attempted instances of changes;
  vi. if the blockchain events are determined to be anomalous, archive the operating of the global model or assembly, revert to the recent version of the global model or assembly, and add the attempted instances of change to the anomaly database.

3. The artificial intelligence system in claim 2,
a. with the anomaly database being a version of the database amongst a set of of the database, with each version of the database being saved to the blockchain via the blockchain node application;
b. with the set of the database comprising operating of the database and a recent version of the database, with the recent version of the database having been deployed prior to the operating of the database.

4. The artificial intelligence system in claim 2, additionally comprising:
a. a smart contract assembly,
  i. with the smart contract assembly comprising one or more smart contracts, and configured to be instructionally and informationally engaged with the set of neural networks and the blockchain node application;
  ii. with the smart contract assembly being a version of the assembly amongst a set of the assembly, with each version of the assembly being saved to the blockchain via the blockchain node application;
  iii. with the set of the assembly comprising operating of the assembly and a recent version of the assembly, with the recent version of the assembly having been deployed prior to the operating of the assembly;
  iv. with the smart contract assembly comprising or controlling the decentralized data transfer application and the encrypted communication application.

5. The artificial intelligence system in claim 4, additionally comprising:
a. cryptographic tokens operating via the blockchain, with the cryptographic tokens being managed by the smart contract assembly;
b. with the smart contract assembly configured to transmit cryptographic tokens to a fifth subset of the plurality of local devices in exchange for transmission of the trained global nodes.

6. An artificial intelligence system comprising:
a. a plurality of local devices, with each local device in the plurality of local devices comprising a processor and a storage medium for storing local data;
b. a blockchain and a blockchain node application;
c. a set of neural networks;
  i. with the set of neural networks comprising a global model, with the global model comprising global nodes, with the global nodes having node weights;
  ii. with the set of neural networks configured to be instructionally and informationally engaged with the blockchain node application;
d. an anomaly database,
  i. with the anomaly database configured to map data sets of code segments, blockchain event parameters, and the node weights to risk levels and known vulnerabilities;
e. a decentralized data transfer application;
  i. with the decentralized data transfer application operating on the blockchain, providing an exchange interface between the plurality of local devices and the blockchain node application to facilitate the data transfer;
  ii. with the decentralized data transfer application configured to distribute an operating of the global model across the plurality of local devices;
f. with each local device of the plurality of local devices being a ledger holder of the blockchain and configured to train the global nodes by adjusting the node weights using the local data;

g. with the blockchain node application configured to save the trained global nodes to the blockchain;
h. with the blockchain node application configured to update the global model using the trained global nodes global model;
i. with the set of neural networks trained to detect attempted instances of changes to the operating version of the global model and configured to, upon detecting the attempted instances of changes:
  i. match the attempted instances of changes to code segments in the anomaly database;
  ii. if the attempted instances of changes match code segments identified as having a risk level or known vulnerability, flag the attempted instances of changes.

7. The artificial intelligence system of claim 6,
a. with the global model being a version of the global model amongst a set of of the global model, with each version of the global model being saved to the blockchain via the blockchain node application.

8. The artificial intelligence system of claim 7,
a. with the set of the global model comprising the operating of the global model and a recent version of the global model, with the recent version of the global model having been deployed prior to the operating version of the global model.

9. The artificial intelligence system of claim 6, with the decentralized data transfer application additionally comprising a localized port,
a. with the localized port being saved to and configured to operate on the plurality of local devices or configured to be accessed by the plurality of local devices;
b. with the localized port configured to transfer the trained global nodes to the blockchain node application via the decentralized data exchange platform.

10. The artificial intelligence system of claim 6, with the set of neural networks trained to compare the operating global model with the recent version of the global model to detect instances of change.

11. The artificial intelligence system of claim 6,
a. wherein if the attempted instances of changes do not match code segments identified as having a risk level or known vulnerability, request confirmation from a subset of the plurality of local devices of the attempted instances of change via the encrypted communication application.

12. The artificial intelligence system of claim 6,
a. wherein if the attempted instances of changes do not match code segments identified as having a risk level or known vulnerability, record identifications of a subset of the plurality of local devices approving the attempted instances of changes.

13. The artificial intelligence system of claim 6
a. wherein if the attempted instances of changes do not match code segments identified as having a risk level or known vulnerability, deny cryptographic token distribution to a subset of the plurality of local devices that have not either approved or rejected the attempted instances of changes.

14. The artificial intelligence system of claim 6,
a. wherein if the attempted instances of changes do not match code segments identified as having a risk level or known vulnerability, reward a subset of the plurality of local devices that have either approved or rejected the attempted instances of changes with cryptographic token distributions.

15. The artificial intelligence system of claim 6, with the neural networks additionally trained to:
a. analyze blockchain events transpiring for a period after the attempted instances of changes are incorporated, determine whether the blockchain event parameters are anomalous.

16. The artificial intelligence system of claim 14, with the neural networks additionally trained to:
a. determine whether the blockchain event parameters are anomalous by matching the blockchain event parameters in the anomaly database.

17. The artificial intelligence system of claim 14, with the neural networks additionally trained to:
a. determine whether the blockchain event parameters are anomalous by testing inputs corresponding to the blockchain events with the recent version of the global model to produce hypothetical blockchain event parameters, and compare the blockchain event parameters with the hypothetical blockchain event parameters to produce a parameter differential.

18. The artificial intelligence system of claim 14, with the neural networks additionally trained to:
a. if the blockchain events are determined to be anomalous, archive the operating version of the global model and revert to the recent version of the global model or assembly.

19. The artificial intelligence system of claim 17, with the neural networks additionally trained to:
a. if the blockchain events are determined to be anomalous, archive the operating version of the global model or assembly, add the attempted instances of change to the anomaly database.

20. The artificial intelligence system of claim 14, with the neural networks additionally trained to:
a. if a parameter differential is greater than a set threshold, archive the operating of the global model and revert to the recent version of the global model or assembly.

* * * * *